US010949899B2

(12) United States Patent
Zamer (10) Patent No.: US 10,949,899 B2
(45) Date of Patent: Mar. 16, 2021

(54) SYSTEMS AND METHODS FOR INFERRED REVIEW

(71) Applicant: EBAY INC., San Jose, CA (US)

(72) Inventor: Kamal Zamer, Austin, TX (US)

(73) Assignee: EBAY INC., San Jose, CA (US)

( * ) Notice: Subject to any disclaimer, the term of this patent is extended or adjusted under 35 U.S.C. 154(b) by 820 days.

(21) Appl. No.: 14/584,971

(22) Filed: Dec. 29, 2014

(65) Prior Publication Data

US 2016/0189253 A1 Jun. 30, 2016

(51) Int. Cl.
G06Q 30/02 (2012.01)
G06Q 20/32 (2012.01)
G06Q 20/20 (2012.01)

(52) U.S. Cl.
CPC ......... *G06Q 30/0282* (2013.01); *G06Q 20/20* (2013.01); *G06Q 20/3224* (2013.01); *G06Q 30/0205* (2013.01)

(58) Field of Classification Search
CPC .................................................... G06Q 30/02
See application file for complete search history.

(56) References Cited

U.S. PATENT DOCUMENTS

| | | | |
|---|---|---|---|
| 2004/0128282 A1* | 7/2004 | Kleinberger | G06F 17/30867 |
| 2005/0034071 A1* | 2/2005 | Musgrove | G06F 17/277 |
| | | | 715/256 |
| 2009/0307303 A1* | 12/2009 | Bensley | G06F 9/5055 |
| | | | 709/203 |
| 2011/0099046 A1 | 4/2011 | Weiss et al. | |
| 2012/0271717 A1* | 10/2012 | Postrel | G06Q 30/02 |
| | | | 705/14.58 |
| 2012/0316917 A1* | 12/2012 | Tellis | G06Q 30/02 |
| | | | 705/7.29 |

(Continued)

FOREIGN PATENT DOCUMENTS

| | | |
|---|---|---|
| CN | 103679507 A | 3/2014 |
| CN | 107430732 A | 12/2017 |
| WO | 2016/109530 A1 | 7/2016 |

OTHER PUBLICATIONS

PCT International Search Report and Written Opinion in PCT/US2015/067851, dated Mar. 30, 2016, 7 pages.

(Continued)

*Primary Examiner* — Kurtis Gills
(74) *Attorney, Agent, or Firm* — Shook, Hardy & Bacon, LLP (57) ABSTRACT

Systems and methods are provided for generating inferred reviews of service providers. Inferred reviews may be generated based on user behavior data for one or more users. The user behavior data may include information that represents how far a user travels to a service provider, how many similar service providers the user passes on the way to the service provider, a number of repeat visits to the service provider, a typical time for services at the service provider, or a length of time the user has been a customer or attendee of the service provider. A service provider may include a merchant, a hotel, a physician, a contractor, another service provider that provides goods or services for a cost or may include non-profit service providers, charity-based service providers or public locations such as parks, rest stops or other locations.

19 Claims, 6 Drawing Sheets

(56) References Cited

U.S. PATENT DOCUMENTS

| | | | | |
|---|---|---|---|---|
| 2014/0025670 A1* | 1/2014 | Daran | ............... | G06F 17/3053 |
| | | | | 707/724 |
| 2014/0200937 A1* | 7/2014 | Friedman | ............ | G06Q 30/016 |
| | | | | 705/7.13 |
| 2014/0258169 A1* | 9/2014 | Wong | ............... | G06Q 30/0282 |
| | | | | 705/347 |
| 2016/0140240 A1* | 5/2016 | Allen | ............... | G06F 17/30867 |
| | | | | 707/733 |

OTHER PUBLICATIONS

PCT International Preliminary Report on Patentability in PCT/US2015/067851, dated Jul. 4, 2017, 7 pages.

Extended European Search Report Received for European Patent Application No. 15876163.5, dated May 4, 2018, 8 pages.

Response to European Search Report Filed on Nov. 22, 2018, for European Patent Application No. 15876163.5, dated May 4, 2018, 19 pages.

Communication Pursuant to Article 94(3) EPC received for European Patent Application No. 15876163.5, dated Apr. 9, 2020, 8 pages.

Office Action received for Chinese Patent Application No. 201580077059.3, dated Jan. 19, 2020, 17 pages (8 Pages of Official Copy and 9 Pages of English Translation).

Response to Office Action filed on Mar. 30, 2020, for Chinese Patent Application No. 201580077059.3, dated Jan. 19, 2020, 13 pages (9 pages of Official Copy & 4 Pages of English Pending Claims).

Office Action received for Chinese Patent Application No. 201580077059.3, dated May 8, 2020, 16 pages (7 pages of Official copy and 9 pages of English Translation).

Response to Office Action filed on Jul. 23, 2020 for Chinese Patent Application No. 201580077059.3, dated May 8, 2020, 12 pages (8 pages of official copy & 4 pages of English Translation of claims).

Decision of Rejection received for Chinese Patent Application No. 201580077059.3, dated Sep. 27, 2020, 6 pages.

\* cited by examiner

SYSTEMS AND METHODS FOR INFERRED REVIEW

TECHNICAL FIELD

The present invention generally relates to networked systems and, more particularly, to systems and methods for extracting opinion information from network users' behavioral data.

BACKGROUND

It has become common for prospective customers of a business who are also users of a network such as the Internet to access online reviews of the business prior to use. The online reviews are typically posted by previous customers who are either exceedingly happy or exceedingly unhappy with the business. However, online reviews can be misleading and/or biased. It can be inconvenient for a typical customer to write and post a review of a particular business. For this reason, it is often customers with the most extreme positive or negative opinions that take the time to write and post the review. It would therefore be desirable to be able to provide improved networked systems and associated methods for rating service providers.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Systems and methods are provided for generating inferred reviews of service providers such as merchants, medical providers, or other service providers. The inferred reviews may be generated based on user behavior such as whether a user is a repeat customer of a merchant, the distance the user travels from home or work to get to a particular doctor's office, the length of time a user has been a loyal customer of a restaurant, or whether the user passes by similar service providers along the way to a particular service provider (as examples).

The user behavior may be determined based on location history data for the user based on the known location of the user's smart phone or other portable electronic device. However, this is merely illustrative. In some embodiments, the user behavior may be determined based on purchases made by the user. For example, if the user makes payments with a particular payment provider, that payment provider may be able to determine when and how often that user visits a particular merchant or other merchants with similar goods and/or services.

Consumers often want to understand the best place to go for a particular good or service. The systems and methods disclosed herein may help provide, for example, a new user who has moved into an area or who is unfamiliar with their area an understanding of how loyal customers are to a specific businesses in the area and get the benefit of, for example, "going where the locals go". The systems and methods described herein may also help businesses understand how loyal customers are to their business, and how that business compares with other, similar competing businesses. Businesses can use this customer loyalty insight to make improvements and offer a better overall customer experience.

The system may detect, for example, a user at a particular merchant for the first time. Subsequently, the system may determine that that user is not going to a competing vendor/business for the same service, and thus determine a business has a point of loyalty. For example, a new patient at a dentist office that returns for additional services at that dentist office may be determined to have approved of the services of that office. Based on additional data such as the time spent waiting for services, price information, insurers accepted information or other information about the dentist or the users, it may be determined that the user primarily approves of that dentist based on the level of services, low prices, low prices for uninsured patients, etc.

In another example, if a user that has many choices for a particular good or service, especially when there are choices more convenient or less expensive for the user, is determined to typically only visit a select few businesses for that good or service, then the user may be determined to be loyal to those few businesses. However, the user may be determined to be loyal at a level of loyalty that is less than that of a user that only visits one of those select few businesses.

Other aspects of a user's behavior may also be tracked and used to determine inferred reviews of service providers that can be provided to other users. For example, a user's purchase history, email accounts, and/or social media accounts may be scraped to determine particular goods (e.g., baked goods), merchants, spending amounts, or purchase habit information of a particular user. For example, it may be determined that a user buys groceries at a particular grocery store each week, but on the same day, purchases baked goods at a bakery. This may be determined to be an endorsement of the bakery, particularly if the grocery store also has a bakery and/or other bakeries are closer to the grocery store that the bakery to which the user goes.

A system can then build inferred reviews of businesses such that users who are looking for a new dentist, grocery store, etc. can have some level of confidence and more insight into how loyal customers are to that business/vendor, whether or not those customers have posted a review.

Based on, for example, payment provider transaction data, public records of businesses, merchant store data (e.g., from a payment provider or from the merchant), and/or other user or merchant information, a system such as a payment provider system can build a database with scores and/or rankings of various types of businesses around each user. If a particular user goes to the business closest to their home or work, for example, no point of loyalty may be rewarded. However, if that user goes out of their way to a specific grocery store, dentist, doctor, etc. that may be determined to be a very strong indicator of loyalty and, for example, one or more loyalty points may be determined for that business. Businesses or merchants may have different loyalty points or scores for different types of consumers. For example, younger consumers may favor store A, while older consumers may favor store B, even though both stores sell the same type of merchandise or provide similar services. Other traits of users include economic status, buying habits, gender, home location, type of interest, etc. For example, a novice wine drinker may prefer wine merchant A, while a "wine geek" may favor wine merchant B.

A user location such as a home location or work location (e.g., as determined by global position system (GPS) signals from the user device that indicate where the user spends most of their time at night and during the day or as determined based on other sources of user information) may be compared with the locations to which the user goes for products and services. Loyalty points may be determined and added to a score for a business proportionally (for example) to the distance traveled.

Various locations provide equipment for communications with a user device of a user at the location. The equipment may include wireless communications equipment such as short range wireless communications equipment or other wireless communications equipment. The equipment may sometimes be referred to as beacon equipment or beacons. Wireless communications equipment that may be included in a beacon at a location may include Bluetooth Low Energy (BLE) beacon communications equipment, wireless local area network equipment (e.g., WiFi based equipment), cellular network equipment, global positioning system (GPS) equipment, combined cellular and GPS equipment, other radio or microwave based communications equipment, infrared communications equipment, and/or any combination thereof. Beacon communications may be used alone or in combination with other sources of user information such as purchase transaction information, GPS information from the user's device, email scrape or social media scrape information, etc. to determine how and where a user purchases services and goods and which type of services and goods are purchased.

Figure 1A:
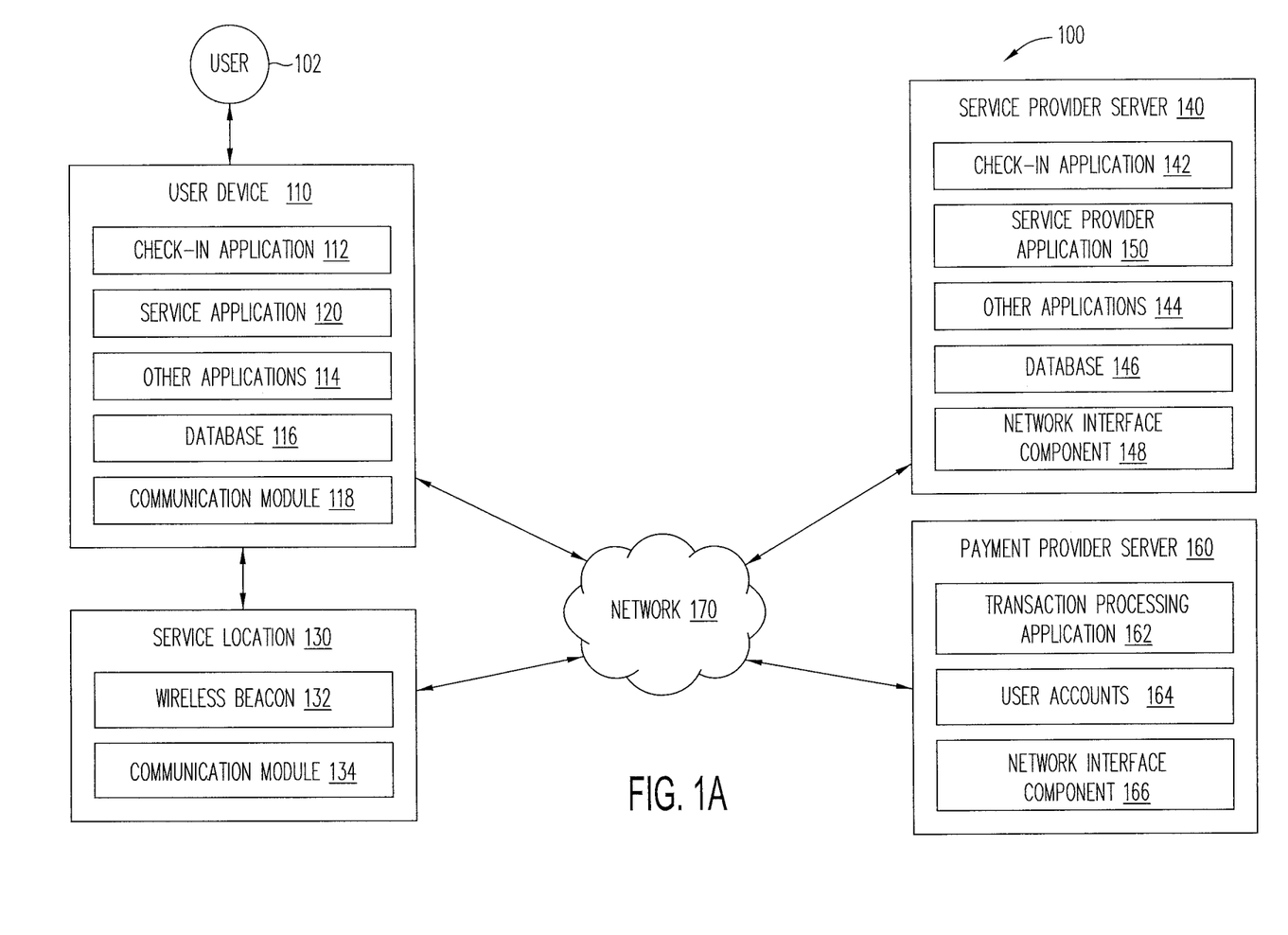
FIG. 1A is a block diagram of an illustrative networked system configured to extract opinion information from user behavior data, according to an embodiment.

FIG. 1A is a block diagram of a networked system 100 configured for extracting user opinion information from user behavior information to generate and provide inferred reviews, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1A may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 may include one or more users such as user 102, each having a user device 110, a service location 130, a service provider server 140, and a payment provider server 160 in communication over a network 170. In some embodiments, each user 102 (e.g., a visitor to a service location such as a hotel guest), may utilize their corresponding user device 110 to check-in to service provider server 140. Service location 130 may correspond to a hotel, a motel, a resort, a campground, or other location that provides guest accommodations, a merchant that provides goods and/or services, a doctor's office, a hospital, a dentist's office, a clinic or other medical services provider or any other entity that provides goods and/or services at a particular location. Service location 130 may also correspond to a location that is unconnected with paid services such as a public park, a public beach, or other location. Service provider server 140 may correspond to a general server for multiple service locations (e.g. a server for a merchant chain) or may be specific to only service location 130 (e.g. a server for a particular merchant).

User device 110 may be used to track the location of user 102. For example, GPS circuitry or wireless communications circuitry of user device 110 may track the user's location and/or payments, emails, social media posts or other communications that are made at a particular location or about a particular location may be used to determine that the user has visited that location. In some situations, users 102 may check-in at a particular location with user device 110 through a beacon 132 (e.g., a wireless beacon) at service location 130, through a social media application or website or by other check-in equipment.

User device 110, service location 130, service provider server 140, and/or payment provider server 160 may each include one or more processors, memories, and other appropriate components for executing instructions such as program code and/or data stored on one or more computer readable mediums to implement the various modules, engines, applications, data, and steps described herein. For example, such instructions may be stored in one or more computer readable media such as memories or data storage devices internal and/or external to various components of system 100, and/or accessible over network 170.

User device 110 may be implemented using any appropriate hardware and software such as hardware and software configured for wired and/or wireless communication with, network 170, beacon 132, service provider server 140, payment provider server 160 and/or other network connected devices and/or servers. For example, in one embodiment, user device 110 may be implemented as a personal computer (PC), a smart phone, personal digital assistant (PDA), laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®. The user device may be managed or controlled by any suitable processing device.

As shown in FIG. 1A, user device 110 may contain a check-in application 112, a service application 120, other applications 114, a database 116, and a communication module 118. Check-in application 112, service application 120, and other applications 114 may correspond to processes, procedures, and/or applications executable by a hardware processor, for example, a software program. In other embodiments, user device 110 may include additional or different software or hardware modules and/or engines as required.

In some embodiments, check-in application 112 may be used by the user 102 of user device 110 to establish a connection between user device 110 and service provider server 140 and/or payment provider server 160. Check-in application 112 may correspond to a specific application utilized by user device 110 with service provider server 140 and/or payment provider server 160 to complete a check-in with service provider server 140 and/or payment provider server 160. The check-in with service provider server 140 may correspond to a process to log in to a user account of user 102 with service provider server 140 and/or payment provider server 160. In other embodiments, the check-in may provide and/or verify an identity of user 102, including transmission of an identifier for user 102 and/or user device 110. The check-in may be completed over network 170. In such embodiments, check-in application 112 may correspond more generally to a browser application configured to communicate with service provider server 140.

Check-in application 112 may also correspond to an application available over the Internet for download from service provider server 140 and/or other server corresponding to service location 130. Check-in application 112 may utilize communications module 118 to exchange short range wireless communications with beacon 132 at service location 130 to complete a check-in process. For example, service location 130 may include infrastructure with beacon 132 to communicate with user device 110 and complete the check-in process with service provider server 140. Beacon 132 may be configured to transmit an identifier for reception by user device 110.

Check-in application 112 may execute in the background of an operating system of user device 110 and be configured to establish connections, using communication module 118 of that user device 110, with one or more beacons 132 (e.g., wireless beacons) at service location 130. The connection may be established with or without user input from user 102. For example, beacon 132 may broadcast a token, such as a universally unique identifier (UUID), for reception by check-in application 112. Check-in application 112 may utilize communication module 118 of the user device 110 to receive the token from beacon 132. If check-in application 112 acknowledges the UUID as identifying service location 130, beacon 132, service provider server 140 and/or payment provider server 160, check-in application 112 may transmit an identifier corresponding to a user 102 and/or a user device 110 back to beacon 132. Check-in application 112 may utilize communication module 118 to communicate with beacon 132 (e.g., over near field communication, Bluetooth, Bluetooth Low Energy, radio, infrared, WiFi, cellular, GPS, combined cellular and GPS, microwave, a combination thereof, or other connection). The identifier from user device 110 may include, be transmitted with, concatenated with, or otherwise bundled with the identifier received from beacon 132.

Service application 120 may be used, for example, to provide a convenient interface to permit user 102 to receive, request, and/or view information, products and/or services. Service application 120 may correspond to an application specific to service location 130 and/or service provider server 140, such as an application downloadable over network 170 and/or through beacon 132. However, in other embodiments, service application 120 may correspond more generally to any application configured to receive information, targeted assistance, status updates, incentive offers, product offers, and/or service offers, including a browser application.

In various embodiments, check-in application 112 and service application 120 may be incorporated in the same application so as to provide their respective features in one convenient application interface.

User device 110 may include other applications 114 as may be desired in particular embodiments to provide features to user device 110. For example, other applications 114 may include security applications for implementing client-side security features, programmatic client applications for interfacing with appropriate application programming interfaces (APIs) over network 170, or other types of applications. Other applications 114 may also include email, texting, voice and IM applications that allow a user to send and receive emails, calls, texts, and other notifications through network 170. In various embodiments, other applications 114 may include financial applications, such as banking, online payments, money transfer, or other applications. Other applications 114 may include browser and/or mapping applications where the functions are not provided by check-in application 112 and/or service application 120. Other applications 114 may contain software programs, executable by a processor, including a graphical user interface (GUI) configured to provide an interface to the user.

User device 110 may further include memory such as database 116 which may include, for example, identifiers such as operating system registry entries, cookies associated with check-in application 112, service application 120, and/or other applications 114, identifiers associated with hardware of user device 110, or other appropriate identifiers, such as identifiers used for payment/user/device authentication or identification. Database 116 may include user device tokens and/or encryption keys, including a public key of service location 130 and/or service provider server 140 for beacon 132. Database 116 may include identifying information for tokens enabling check-in application 112 to identify beacon 132 when receiving a corresponding token. In one embodiment, identifiers in database 116 may be used to associate user device 110 with a particular account maintained by the account provider. Database 116 may further include online account access information and/or shopping list information.

Each user device 110 may include a communication module 118 adapted to communicate with beacon 132, service provider server 140, and/or payment provider server 160. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, BLE, WiFi, cellular, GPS, combined cellular and GPS, microwave, near field communication devices, and/or a combination thereof. Communication module 118 may communicate directly with beacon 132 without network 170 using short range wireless communications.

Service location 130 may include a plurality of locations within service location 130 such as sections of a store (e.g., a bakery section). In some embodiments, each location may include a beacon such as a wireless beacon. However, this is merely illustrative. In some embodiments, other functions of user device 110 or other information sources may be used to determine the location or a sub-location within a location of user 102.

In various embodiments, service location 130 includes at least one communication module 134 adapted to communicate with user devices 110, service provider server 140, and/or payment provider server 160. Communication module 134 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, BLE, cellular, GPS, combined cellular and GPS, microwave, near field communication devices, and/or any combination thereof. Communication module 134 may communicate directly with user device 110 without network 170 using short range wireless communications.

Service provider server 140 may be maintained, for example, by a service location including one or a plurality of service locations. Generally, service provider server 140 may be maintained by anyone or any entity that establishes and/or maintains a location with services, accommodations, and/or products offered to users. In this regard, service provider server 140 may include one or more hardware or software applications, modules, or engines which may be configured to interact with user devices 110 and/or service location 130 to complete check-in processes for user devices 110. Although only one service provider server is shown, a plurality of service provider servers may be utilized. In various embodiments, the check-in and assistance features of service provider server 140 may also be offered by payment provider server 160. Thus, all or part of the described features and processes of service provider server 140 may be incorporated within payment provider server 160.

Service provider server 140 may include a check-in application 142, a service provider application 150, a database 146, and a network interface component 148. Check-in application 142 and service provider application 150 may correspond to processes, procedures, and/or applications executable by a hardware processor, for example, a software program. In other embodiments, service provider server 140 may include additional or different software as required.

Check-in application 142 may correspond to processes to complete check-in with user device 110. Thus, check-in application 142 may correspond to the server side application of service provider server 140 configured to transmit and/or receive check-in requests from user device 110 and complete the check-in requests. A check-in request may include log-in information for a user account in database 146. Check-in may be completed by verifying the account information. However, in embodiments where a user account has not been previously established by user 102 and/or service provider server 140 does not offer user account services, check-in application 142 may receive other information for identifying user 102, such as user names/identifiers, user device identifiers, group identifiers, an identifier for an account with another server (e.g., a payment account/payment account identifier with payment provider server 160), or other information.

Check-in information may be provided that corresponds to one or more user accounts of user 102 with another server, such as payment provider server 160. In such embodiments, service provider server 140 may determine user information such as a user history and/or user preferences from information received from payment provider server 160. Payment provider server 160 may provide information about previous purchases/visits by user 102 at the same or similar locations to service location 130 or may provide other information.

In various embodiments, service provider server 140 may include other applications 144 as may be desired in particular embodiments to provide features to service provider server 140. For example, other applications 144 may include security applications for implementing server-side security features, programmatic server applications for interfacing with appropriate application programming interfaces (APIs) over network 170, or other types of applications. Other applications 144 may contain software programs, executable by a processor, including a graphical user interface (GUI), configured to provide an interface to a user.

Service provider server 140 may include a database 146 which may include, for example, identifiers such as operating system registry entries, cookies associated with check-in application 142 and/or service provider application 150, identifiers associated with hardware of service provider server 140, or other appropriate identifiers, such as identifiers used for payment/user/device authentication or identification. Database 146 may include identifiers and/or user accounts of user 102, which may comprise an identifier for users 102 and/or user devices 110. In various embodiments, identifiers in database 146 may be used by a payment/credit provider, such as payment provider server 160, to associate user 102 with a particular account maintained by payment provider server 160. For example, an identifier for a payment account with payment provider server 160 may be stored with a user account and/or identifiers of users 102 in database 146. In other embodiments, a user account stored in database 146 may include a shared identifier with the payment account with payment provider server 160.

In various embodiments, service provider server 140 includes at least one network interface component 148 adapted to communicate with user devices 110, service location 130, and/or payment provider server 160 over network 170. In various embodiments, network interface component 148 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, BLE, cellular, GPS, combined cellular and GPS, microwave, near field communication devices, and/or any combination thereof.

Payment provider server 160 may be maintained, for example, by an online payment service provider, which may provide user account and payment services on behalf of user 102 and other users. In this regard, payment provider server 160 includes one or more processing applications, which may provide payment for items using a user account with payment provider server 160. In one example, payment provider server 160 may be provided by PAYPAL®, Inc. of San Jose, Calif., USA. However, in other embodiments, payment provider server 160 may be maintained by or include a hotel, a merchant, financial services provider, and/or other service provider, which may provide user account services to user 102. Although payment provider server 160 is described as separate from service provider server 140, it is understood that payment provider server 160 may include services offered by service provider server 140 and vice versa.

Payment provider server 160 of FIG. 1A may include a transaction processing application 162, a database of user accounts 164, and a network interface component 166. Transaction processing application 162 may correspond to processes, procedures, and/or applications executable by a hardware processor, for example, a software program. In other embodiments, payment provider server 160 may include additional or different software or hardware modules, engines or equipment.

Transaction processing application 162 may be configured to receive information from one or more user devices 110 and/or service provider server 140 for processing and completion of financial transactions. Transaction processing application 162 may include one or more applications to process financial transactions between user devices 110 and/or service provider server 140. Financial transactions may include financial information corresponding to user debit/credit card information, checking account information, a user account (e.g., payment account with payment provider server 160), or other payment information. Transaction processing application 162 may complete the financial transaction for the purchase request by providing payment to service provider server 140. In various embodiments, transaction processing application 162 may provide transaction histories, including receipts, to user device 110 in order to provide proof of purchase for an item and/or service. Transaction processing application 162 may also provide the transaction histories to service location 130 for use in pick-up/delivery of the item and/or service.

Additionally, payment provider server 160 includes user accounts 164. As previously discussed, user 102 may establish one or more user accounts with payment provider server 160. User accounts 164 may include user information, such as name, address, birthdate, payment/funding information, travel information, additional user financial information, and/or other desired user data. Information in user account 164 may be utilized by service provider server 140 to determine and provide hotel services, product offers, alerts, and/or service offers to user 102.

In various embodiments, payment provider server 160 may include at least one network interface component 166 adapted to communicate with user device 110, service location 130, service provider device 152, and/or service provider server 140 over network 170. In various embodiments, network interface component 166 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), infrared (IR), BLE, cellular, GPS, combined cellular and GPS, microwave, and/or near field communication devices, and/or any combination thereof.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

User device 110, service location 130, service provider server 140, and payment provider server 160 may be arranged to form one or more installations of computing equipment adapted to extract information from user behavior data and generate inferred reviews of service providers from the extracted information. For example, as shown in FIG. 1B, the components of system 100 may be arranged to form a data accumulation module 180, an extraction engine 184, a scoring engine 188, a ranking engine 192, and user interface equipment 196 as well as a user attribute engine 181 and a service provider attribute engine 185.

Figure 1B:
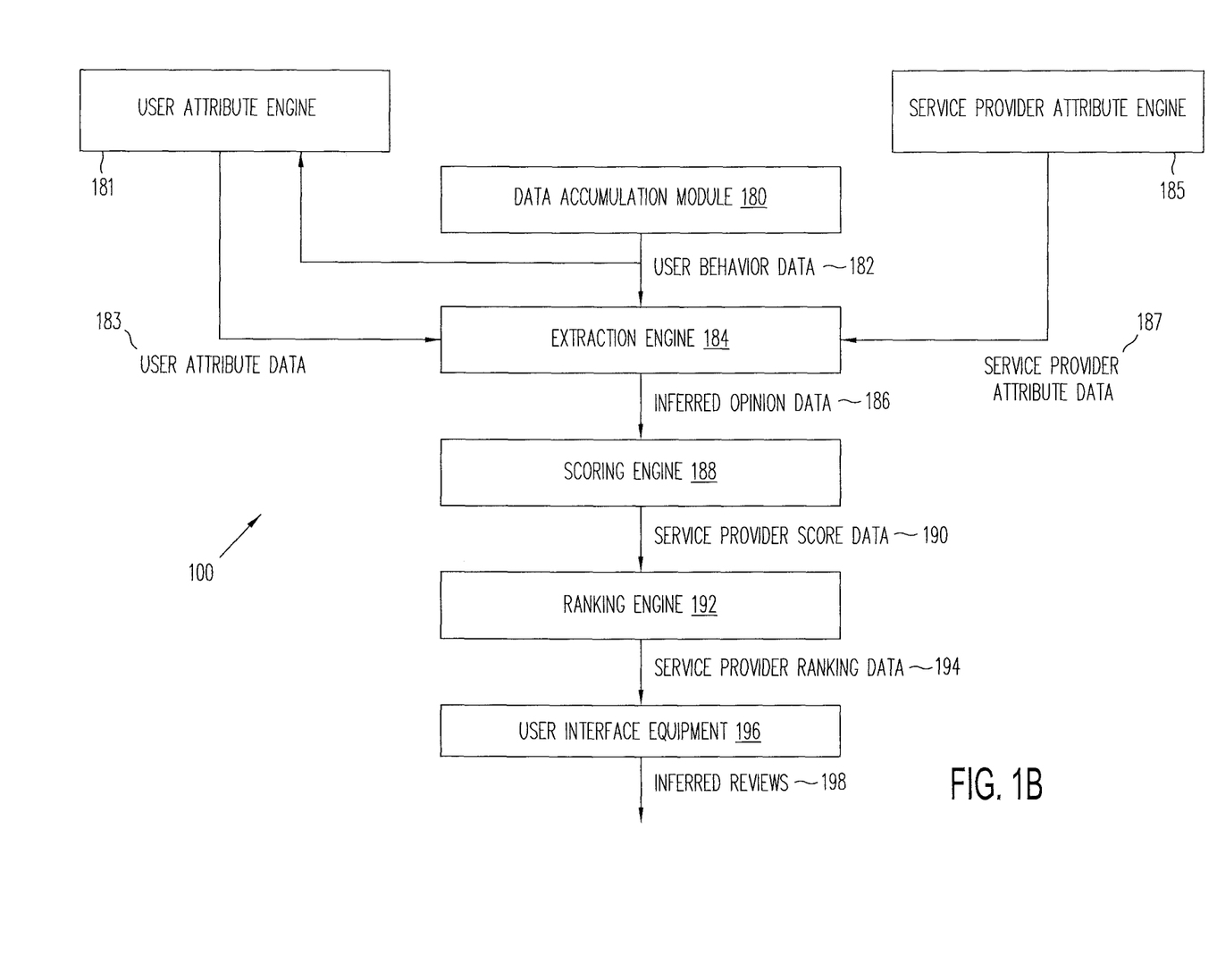
FIG. 1B is an illustrative flow diagram showing how inferred reviews may be generated from user behavior data, according to an embodiment.

As shown in FIG. 1B, user behavior data 182 (e.g., user location data, user purchase history data, user email data, user social media data or other data that indicates where and when one or more users spends time, makes purchases, etc.) may be provided from a data accumulation module 180 to an extraction engine 184. Data accumulation module 180 may be formed as part of a user device and/or as part of a server such as a payment provider server. For example, each user's mobile device may be arranged to accumulate user behavior data for that user or each user's mobile device may be arranged to provide user behavior data for that user to a remote accumulation module at a server such as a payment provider server. A server such as a payment provider server may include a data accumulation module that receives and accumulates processed or unprocessed user behavior data for multiple individual users and provides the accumulated user behavior data 182 to extraction engine 184.

Note that user behavior data, as used herein does not include a user submitting a score, ranking, review, comment, or other action where the user is proactively providing some feedback as to a merchant. Instead, user behavior data is any data collected (e.g., from the user's device(s) or from payment servers or other servers that interact with the user's devices and/or payment cards) while the user goes about their day-to-day activities that informs the system about those day-to-day-activities.

Extraction engine 184 may be collocated with data accumulation module 180 or may be formed separately or remotely from module 180. Extraction engine 184 may receive the user behavior data and extract opinion information from the user behavior data to form inferred opinion data 186 to be provided to a scoring engine such as scoring engine 188. Inferred opinion data 186 may include loyalty points and/or user preference scores for a plurality of service providers for each individual user. For example, inferred opinion data 186 may include numerical scores associated with each service provider that a user visits based on the user behavior data for that user (e.g., a high score may be included for gym that the user frequently attends and a low score may be included for a grocery store that the user passes to attend another grocery store). Inferred opinion data 186 may include scores for each service provider in one or more categories.

Scoring engine 188 may generate service provider score data 190 based on the received inferred opinion data. For example, scoring engine 188 may generate a numerical score for each of a plurality of service providers based on an average or other combination of scores from individual users of that service provider. Service provider score data 190 may include scores for each service provider in a variety of categories as described further hereinafter.

Service provider score data 190 may be provided from scoring engine 188 to ranking engine 192. Ranking engine may rank each service provider relative to each other service provider in a variety of categories by comparing the service provider scores for each service provider in each category. The service provider rankings in the various categories may be provided as service provider ranking data 194 to user interface equipment 196. User interface equipment 196 may organize, formalize, format, or otherwise process the service provider ranking data 194 to provide inferred reviews 198 based on the service provider ranking data 194 to users of the user interface equipment. For example, user interface equipment 196 may provide inferred reviews 198 to a user in a webpage or application format.

As shown in FIG. 1B, a user attribute engine 181 may be provided that generates user attribute data 183 for a plurality of users (e.g., to extraction engine 184). The user attribute data may include age, gender, financial, location, faith, interest, occupation, automobile, product preference, or other information associated with each particular user and may be determined based on user provided data and/or data gathered by the user attribute engine from one or more sources such as a user device, a service provider server, a payment provider server, an email server, and/or a social media server (as examples). In some embodiments, a service provider attribute engine 185 may also be provided that provides service provider attribute data 187 (e.g., to extraction engine 184).

Service provider attribute data 187 may include location, product, service, event, or other information for one or more service providers (e.g., a location, a list of products available, opening hours, and sales event information for a department store) and may be generated by service provider attribute engine based on service provider provided data and/or data gathered by the service provider attribute engine from one or more sources such as user devices, a service provider server, a payment provider server, an email server, a social media server, or other media source (as examples).

Extraction engine 184 may determine the inferred opinion data 186 based on the user attribute data and/or the service provider attribute data in some embodiments. Data accumulation module 180, extraction engine 184, scoring engine 188, ranking engine 192, and user interface equipment 196 as well as user attribute engine 181 and service provider attribute engine 185 may each be formed all or in part as a portion or combination of user device 110, service provider server 140 and/or payment provider server 160 and may communicate directly (e.g., via wired or wireless communication) or over a network such as network 170.

Figure 2:
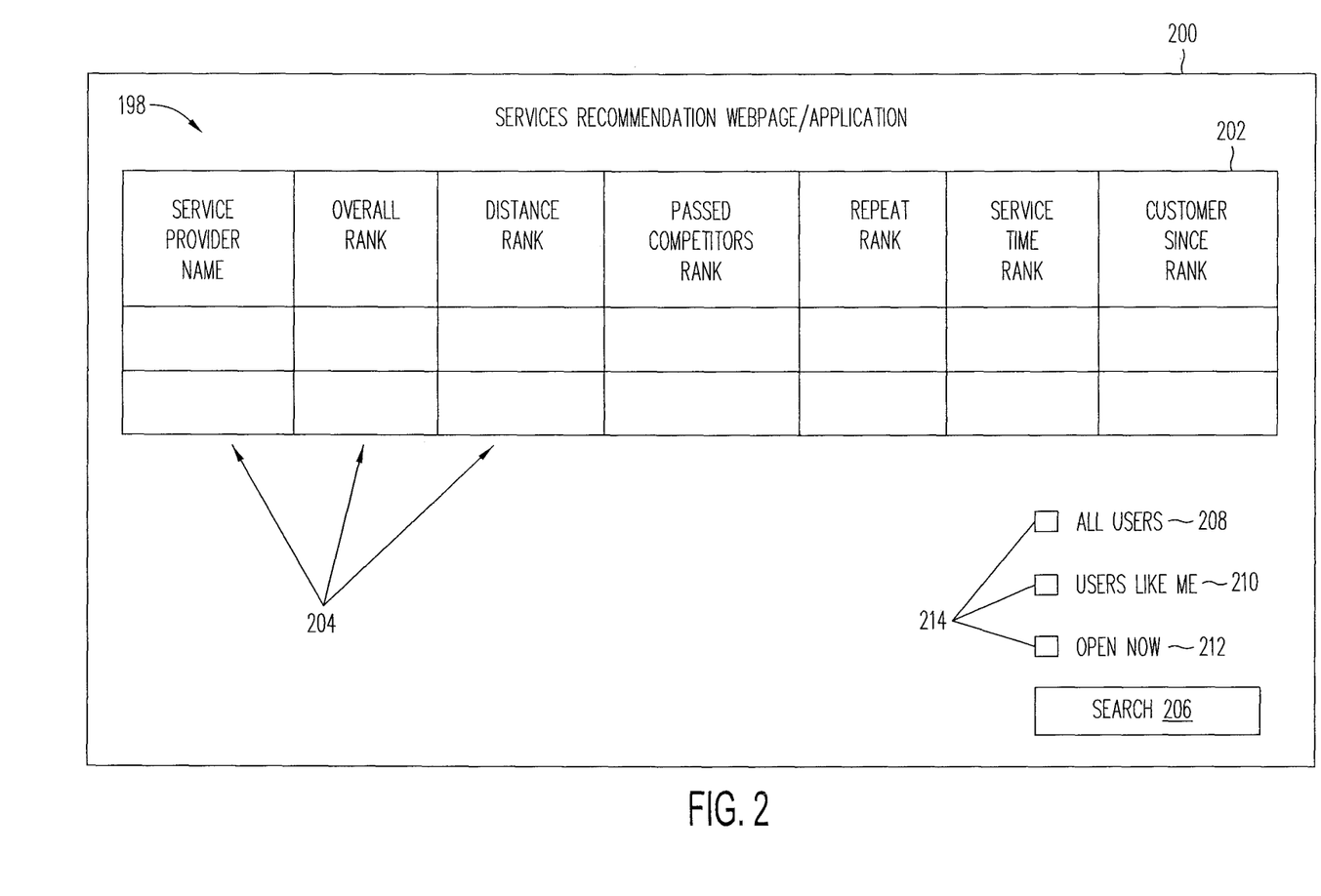
FIG. 2 is a diagram of an illustrative services recommendation webpage or application, according to an embodiment.

FIG. 2 is a diagram of an exemplary webpage or application for providing reviews of service providers to a user (e.g., by user interface equipment 196 of FIG. 1B) based on the inferred opinions of other users of those service providers. For example, the inferred opinions of each other user may be extracted from location data, purchase history data, email scrape data, social media data, or other data that indicates when and where that particular user shops, lives, works, etc. Inferred opinions of various users may be combined to form rankings in various categories for service providers according to various criteria.

As shown in FIG. 2, a services recommendation webpage/application 200 may provide a ranked list of service providers. In the example of FIG. 2, the ranked list is provided in a table 202 on a webpage or in an application. However, this is merely illustrative. Inferred reviews may be provided to a user via any suitable electronic and/or printed medium and may be provided in a ranked list, a scrollable list, a set of "swipable" screens each dedicated to a service provider, or any other suitable format. In one other suitable example, an inferred review may be provided by simply providing only the highest ranked service provider (e.g., an image, a map, a link to a website, etc. may be provided) to a user when a user searches for a service provider.

In the example of FIG. 2, table 202 includes a set of columns 204 of data associated with a set of service providers where the columns correspond to a service provider name or identifier, and rankings in various categories for each service provider. For example, each service provider may have, as shown, an overall rank, and other ranks in various categories such as a distance rank, a passed competitor's rank, a repeat rank, a service time rank, a customer since rank and/or any other suitable inferred rank. The service providers in table 202 may include all service providers in an area around, or specified by, the user or may include only service providers of a given type. For example, service providers may be selected for display based upon a user search for a type of service provider (e.g., a user search for pizza in a search box 206) or selected based upon various other selectable criteria such as an "All Users" criterion 208, a "Users Like Me" criterion 210 or an "Open Now" criterion 212 that are each selectable on the webpage/application 200 (e.g., by clicking or tapping a selection box 214).

Service providers in table 202 may be presented in order of their overall rank in the "overall rank" column. However, this is merely illustrative. If desired, a user may be provided with the ability to sort the list of service providers in table 202 based on other rankings (e.g., by clicking on the column header for a particular rank). The overall rank for each service provider may be an average, weighted average, a median, or other combination of the distance rank, the passed competitors rank, the repeat rank, the service rank, the customer service rank or any combination thereof.

A distance rank may be determined for a service provider based on the average distance each user of that service provider commonly travels to reach the location of that service provider (e.g., from the user's home or work or other location). However, the distance rank may be biased, in some scenarios, based on a lack of competitors, or the particular geographical location and/or surrounding environment of a particular service provider. In order to provide further insight into user's attendance of a service provider location, a passed competitors rank may be determined based on the number of similar service providers (e.g., competitors) that each user commonly passes to reach that service provider location. For example, if a typical (e.g., average) user passes three coffee shops on the way to their favorite coffee shop each morning, the favorite coffee shop may be given a passed competitors score of 3 which can be ranked in comparison with the passed competitor scores of other coffee shops. Because the passed competitors rank can provide further insight into the distance rank, in one embodiment, the overall rank of a service provider may be determined (all or in part) by weighting a distance score with a passed competitors score to determine an overall score which can be ranked.

Other information may also be extracted from user behavior data such as the number of times a user has returned to a service provider, the average time for service a user waits at a particular service provider, or a length of time that a user has been an attendee (e.g., a customer or visitor) of a particular service provider location. For example, if a typical (e.g., average) user has visited a particular dentist office 11 times, that dentist office may be given a repeat score of 11 which can be ranked in comparison with the repeat scores of other dentists. For example, if a typical (e.g., average) user waits 20 minutes for service at a particular restaurant, that restaurant may be given a service time score of 20 or 1/20 (as examples) which can be ranked in comparison with the service time scores of other (e.g., similar) restaurants. For example, if a typical (e.g., average) user has been a patient of a particular doctor for 17 years, that doctor may be given a customer since score of 17 which can be ranked in comparison with the customer since scores of other (e.g., similar) doctors.

As noted above, the service providers in the table 202 may be all service providers in an area (e.g., doctor's offices, parks, dentist offices, restaurants, grocery stores, etc. may all be ranked against each other) or any suitable subset of service providers may be displayed (e.g., only parks or only cafes). For example, a user may user search box 206 to enter a specific merchant name or a type of service provider such as "pizza" so that only pizza restaurants are displayed. In another example, the displayed service providers may be selected based on user-related criteria. For example, if an "All Users" criterion is selected, the rankings for the service providers may be determined based on the behavior of all users of those service locations. However, a user with a particular medical condition or a user with a particular type of pet may not be concerned with the behavior of a general user of a doctor's office or pet store and may desire to know the inferred opinions of users with a similar condition or a similar type of pet (as examples). The user may be provided with the ability to select a "Users Like Me" option that computes the rankings in table 202 based on the behaviors of similar users (e.g., users with attributes that are similar to attributes of the searching user). Similar users may be identified based on personally provided information from the searching user and/or the other users or the user attributes may also be inferred based on the users' behavior.

For example, if one user commonly makes purchases for high end parrot food and that user searches (e.g., using box 206) for pet stores and selects the "Users Like Me" option, the rankings in table 202 may be generated based on the behaviors of other purchasers of high end parrot food. In another example, if one user commonly visits a doctor for a diabetes condition and that user searches (e.g., using box 206) for pharmacies and selects the "Users Like Me" option, table 202 may include pharmacies ranked based on the behaviors of purchasers of insulin. In another example, user attributes may include financial or other attributes such as insurance information and/or payment preference information for the user. For example, rankings of medical providers may be provided for users similar to a user that has insurance and pays cash, has insurance and pays with credit, does not have insurance and pays with cash, or does not have insurance and pays with credit (as examples). In this way, a user can be quickly and efficiently guided to the services and locations that fit their needs and desires based on information extracted from user data such as user behavioral data of others without the others, necessarily, having to provide their opinions directly. However, it should be understood that user-reported opinions, reviews, scores and rankings can also be used in combination with inferred opinions in some embodiments.

Figure 3:
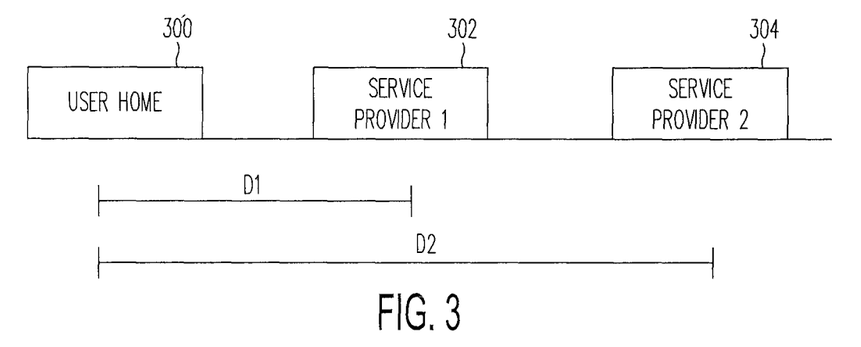
FIG. 3 is a block diagram showing illustrative distances between service providers and a user location that may be used to extract user opinion data from behavior data of a user, according to an embodiment.

FIG. 3 shows an example of two service providers 302 and 304 (labeled "SERVICE PROVIDER 1" and "SERVICE PROVIDER 2" in FIG. 3) located at respective distances D1 and D2 from a user location such as a user's home 300. For example, the service providers 302 and 304 may be two different farmer's markets that are held on the same day at the same time. A system such as system 100 (see FIGS. 1A and 1B) may determine based on, for example, GPS data from the user's mobile phone and/or purchase transactions with a payment provider, that the user drives past the first service provider 302 every Sunday morning to purchase produce and/or other goods and/or services at the second service provider 304 located at a distance D2 that is greater than the distance D1 to the first service provider 302. Service provider 304 may therefore have a greater distance score, a greater passed competitors score, and a greater repeat customer score than service provider 302 from that user. For example, the values of D1 and D2 and/or a ratio or difference of D2 and D1 may be used to weight and/or average an overall score and ranking for service provider 304. The scores from that user may be combined with the scores of other users to determine total scores and/or rankings for the service providers.

In some embodiments, service provider information such as service provider attributes may also contribute to a service provider's score and/or rank. For example, if the user previously attended the service provider 302 farmer's market, but one year ago switched to service provider 304 farmer's market and has not returned, the overall rank of service provider 304 may be boosted (e.g., increased) based on the inferred information that the user chose that service provider over another known competitor and was convinced to stay. The system may detect the behavior change (e.g., when the change happens or retroactively) and may determine whether service provider attribute data indicates a change was made at service provider 302 or 304 (e.g., service provider 304 was newly opened, was remodeled, changed a pricing structure, added a new product or service, etc.).

This type of customer behavior change information may, alone or in combination with the determined service provider attribute data, may be provided to other users (e.g., for rankings) and/or to the service providers themselves. In this way, a service provider such as service provider 302 may learn that a competitor such as service provider 304 has made a successful move to steal a loyal customer (for example).

In another scenario, it may be determined that the user temporarily switched to service provider 304 (e.g., when service provider 304 newly opened, remodeled or offered a discount or incentive) and then returned to shopping/attending service provider 302. In this example, service provider 304 may be ranked without providing an enhanced weight or passed competitors boost because the behavior of the user was not sustained.

Figure 4:
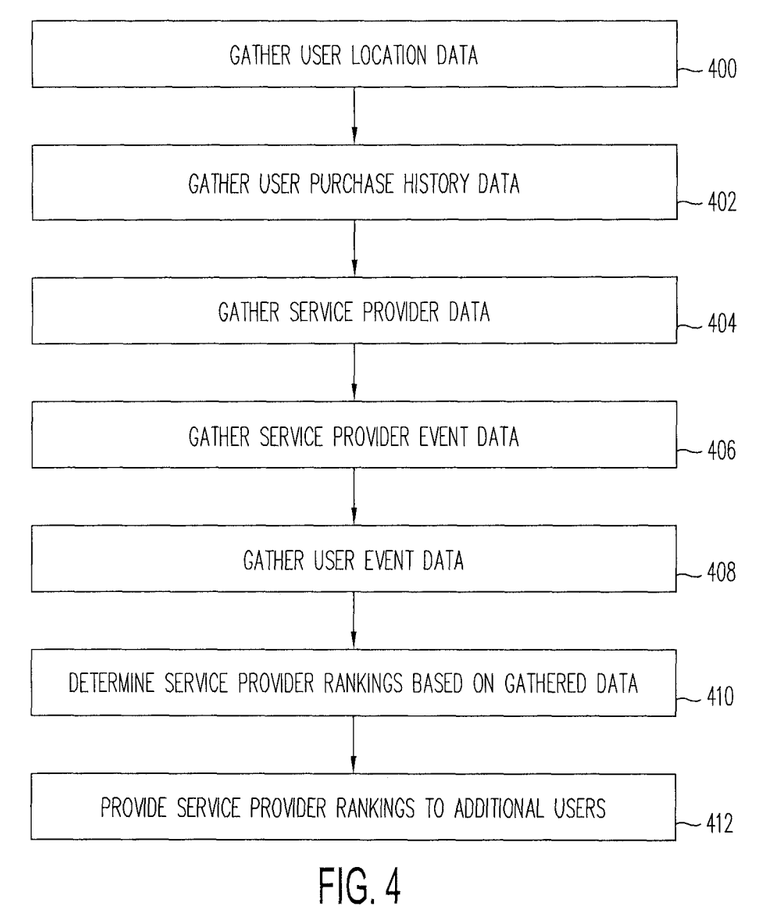
FIG. 4 is a flowchart of an exemplary process for generating and providing service provider recommendations based on user behavior, according to an embodiment.

Illustrative operations that may be performed for generating inferred reviews from user behavior data are shown in FIG. 4.

At step 400, user location data for one or more users may be gathered. For example, a service provider server, a payment provider server, or other server may gather GPS data from a user's mobile phone, may determine locations of purchases in a user purchase history, may scrape location data from a user's emails and/or social media accounts (e.g., an email or social media post about having coffee at a particular café), or other sources of location information for a user (e.g., check-in information from a beacon at the location).

At step 402, user purchase history data for one or more users may be gathered. The purchase history data may be gathered from purchase transactions via one or more payment providers and/or email or other receipts received by the user.

At step 404, service provider attribute data such as service provider data for one or more service providers may be gathered. Service provider data may be gathered from the service provider itself or other sources (e.g., media, email, social media, or other sources). The service provider data may include a location of the service provider, the name of the service provider, contact information of the service provider, product and/or service information, or any other information regarding the service provider.

At step 406, additional service provider attribute data such as service provider event data for one or more service providers may be gathered. Service provider event data may be gathered from the service provider itself or other sources (e.g., media, email, social media, or other sources). The service provider event data may include opening date information, opening hours information, promotion information (e.g., offered discounts or incentives) or any other information regarding the service provider.

At step 408, user attribute data such as user event data for one or more users may be gathered. User event data may be gathered from a user device of the user or other sources (e.g., media, email, social media, or other sources). The user event data may include information associated with events in a user's life such as a marriage or divorce, the birth of a child, a birthday, a new job, or any other information regarding user-related events that may influence decisions the user makes regarding service providers. For example, if it is determined that a male user has become engaged to be married, when the male user searches for clothing stores, the male user may desire inferred reviews of clothing stores based on user behavior data of other engaged male users. In another example, if a user loses a job and stops shopping at a particular store, the user event data indicating the loss of a job may be used to prevent a negative effect on the inferred reviews of that store due to the user's reduced shopping (e.g., due to an external influence, the loss of the job, rather than dissatisfaction with the store). Additional user attribute data may also be gathered such as user preferences, spending habits, financial status, credit ratings, home ownership, age, gender, or the like.

At step 410, service provider rankings for each of the one or more service providers may be determined based on the gathered data. The service provider rankings may be determined by extracting inferred opinion information from the user data and/or the service provider data as described in the examples above. For example, service provider rankings according to various categories such as the categories of the columns 204 of table 202 of FIG. 2 may be determined based on the distance user's travel, the number of competitors users pass, the number of repeat visits users make, the length of time users typically wait for services, the length of time users have remained customers or other numerical and/or statistical information extracted from the gathered data.

Determining service provider rankings may include determining a total distance traveled to one or more service providers, determining one or more intervening service providers (e.g., competitors located between the user and a particular service provider) for one or more service providers, determining a length of time since a first user visit to one or more service providers, determining a repeat visit frequency for one or more service providers, determining a length of time for services for one or more service providers, determining user attributes, determining service provider attributes for one or more service providers, and determining service provider scores and/or service provider rankings for one or more service providers based on the total distance traveled, the intervening service providers, the length of time since first user visit, the repeat visit frequency, the length of time for services, the user attributes, and/or the service provider attributes associated with one or more users for each of the one or more service providers. The service provider rankings may be determined based on the data for all users for which data was gathered or only a subset of the users.

At step 412, the service provider rankings may be provided to additional users (e.g., using user interface equipment). The additional users may be users that access a particular website or application on their computing device to search for service provider rankings. As described above in connection with FIG. 2, the service provider rankings may be provided in a tabular or other format and may be provided for all service providers, a subset of service providers, based on all users, or based on a subset of users for which data has been gathered.

Figure 5:
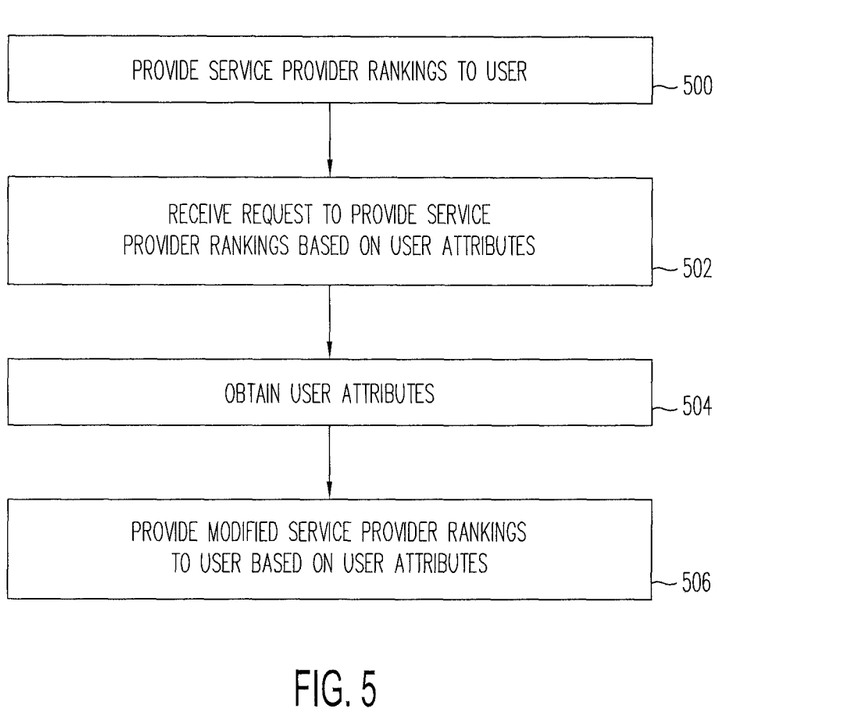
FIG. 5 is a flowchart of an exemplary process for providing service provider recommendations based on user attributes, according to an embodiment.

For example, illustrative operations for providing service provider rankings based on data from a subset of users are shown in FIG. 5.

At step 500, service provider rankings may be provided to a user. For example, a ranked display of service providers with rankings determined based on the behaviors of all users of the service providers may be provided (e.g., in a tabular format as in FIG. 2 or in another format) in an application or one a webpage when the user accesses the application or webpage.

At step 502, a request to provide service provider rankings based on user attributes may be received. Receiving the request to provide the service provider rankings based on user attributes may be received by detecting, for example, a user checking a "Users Like Me" selection box in the application or webpage.

At step 504, the user attributes may be obtained. Obtaining the user attributes may include accessing stored and previously determined attributes for the user from system hardware memory, receiving user attributes from the user, and/or determining the user attributes based on user location data, user purchase history data, user email data, and/or user social media data. The user attributes may include user product preferences, user service preferences, user economic information such as income and/or spending levels, user medical information, user gender, marital status, age, education or generally any other information regarding the user.

At step 506, modified service provider rankings may be provided to the user based on the user attributes. For example, rankings for one or more service providers may be recalculated and provided based on only data representing the behavior of users with the same or similar attributes. For example, a 54 year only woman with an income of 200,000 dollars per year who is married may be provided with automobile dealership information generated based on the inferred opinions of automobile dealerships of other married women between the ages of 50 and 60 years, with incomes over 150,000 dollars and may be provided.

Figure 6:
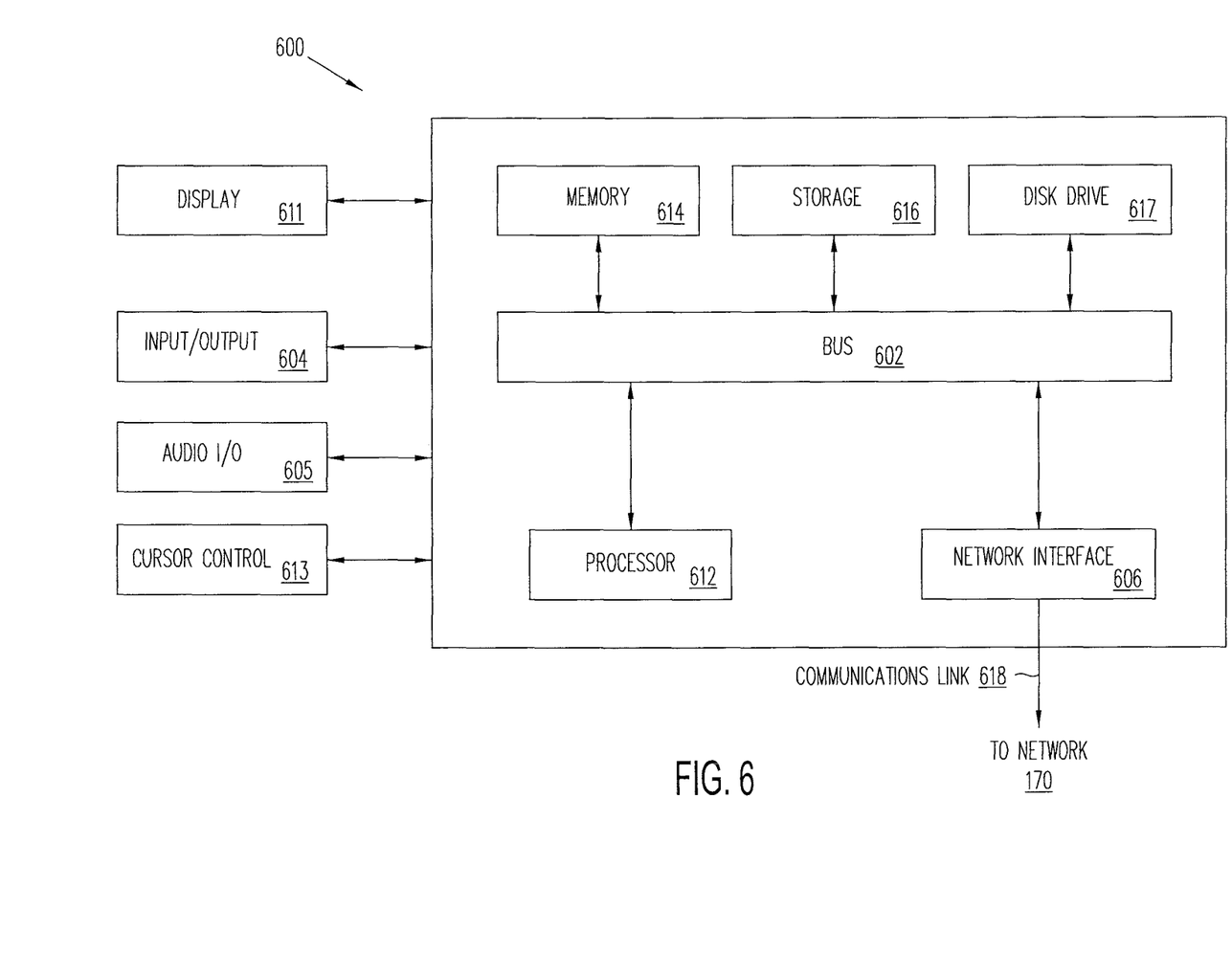
FIG. 6 is a block diagram of a computer system suitable for implementing one or more components in FIGS. 1A and/or 1B, according to an embodiment.

FIG. 6 is a block diagram of a computer system suitable for implementing one or more components in FIG. 1A, according to an embodiment. In various embodiments, the user device may comprise a personal computing device (e.g., smart phone, a computing tablet, a personal computer, laptop, PDA, Bluetooth device, key FOB, badge, etc.) capable of communicating with the network. A service provider and/or payment provider may utilize a network computing device (e.g., a network server) capable of communicating with the network. It should be appreciated that each of the devices utilized by users and service providers may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons, image, or links, and/or moving one or more images, etc., and sends a corresponding signal to bus 602. I/O component 604 may also include an output component, such as a display 611 and a cursor control 613 (such as a keyboard, keypad, mouse, etc.). An optional audio input/output component 605 may also be included to allow a user to use voice for inputting information by converting audio signals. Audio I/O component 605 may allow the user to hear audio. A transceiver or network interface 606 transmits and receives signals between computer system 600 and other devices, such as another user device, a merchant device, or a service provider server via network 170. In one embodiment, the transmission is wireless, although other transmission mediums and methods may also be suitable. One or more processors 612, which can be a micro-controller, digital signal processor (DSP), or other processing component, processes these various signals, such as for display on computer system 600 or transmission to other devices via a communication link 618. Processor(s) 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor(s) 612 and other components by executing one or more sequences of instructions contained in system memory component 614. Logic may be encoded in a computer readable medium, which may refer to any medium that participates in providing instructions to processor(s) 612 for execution. Such a medium may take many forms, including but not limited to, non-volatile media, volatile media, and transmission media. In various embodiments, non-volatile media includes optical or magnetic disks, volatile media includes dynamic memory, such as system memory component 614, and transmission media includes coaxial cables, copper wire, and fiber optics, including wires that comprise bus 602. In one embodiment, the logic is encoded in non-transitory computer readable medium. A non-transitory computer-readable medium may include instructions which, in response to execution by a computer system, cause the computer system to perform some or all of one or more methods as described herein. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A computer system comprising one or more non-transitory computer-readable media with computer-readable instructions, that when executed by the computer system, implement at least:
    a module configured to retrieve user behavior data for a user, the user behavior data comprising location data indicating a plurality of locations for a user device associated with the user, wherein at least one location within the plurality of locations is determined at least by receiving, at a GPS circuitry within the user device, a GPS signal; and
    a first engine configured to generate an inferred user review for the service provider based on the user behavior data, wherein the inferred user review is generated for the service provider at least in part by using the location data to determine the user's presence at a location of the service provider and determine a distance the user traveled to reach the location of the service provider.

2. The system of claim 1, further configured to provide the generated inferred user review to a device associated with an additional user.

3. The system of claim 1, wherein the first engine is configured to generate the inferred user review based on the user behavior data by determining a number of repeat visits to the service provider by the user.

4. The system of claim 1, wherein the first engine is configured to generate the inferred user review based on the user behavior data by determining a length of time for service for the service provider.

5. A method, comprising:
    retrieving, at a server, user behavior data for a user, the user behavior data comprising user location information indicating a plurality of locations for a user device associated with the user, wherein at least one location within the plurality of locations is determined at least by receiving, at a GPS circuitry within the user device, a GPS signal; and
    generating, with the server, an inferred user review for the service provider based on the user behavior data, wherein the inferred user review is generated for the service provider at least in part by using the location data to determine the user's presence at a location of the service provider and determine a distance the user traveled to reach the location of the service provider.

6. A system comprising:
a server configured to:
receive user behavior data from a user device corresponding to a user, the user behavior data comprising location data indicating a plurality of locations for the user device, wherein at least one location within the plurality of locations for the user device is determined at least by receiving, at a GPS circuitry within the user device, a GPS signal; and
generate an inferred user review for the service provider based on the user behavior data, wherein the inferred user review is generated for the service provider at least in part by using the location data to determine the user's presence at a location of the service provider and determine a distance the user traveled to reach the location of the service provider.

7. The system of claim 6, wherein the server is further configured to receive user behavior data from a payment provider server.

8. The method of claim 5, wherein the inferred user review is generated further by determining a number of competitors of the service provider that the user passes when traveling to reach the location of the service provider.

9. The system of claim 1, wherein the service provider provides one or more of a service, a product, and an accommodation.

10. The system of claim 1, wherein the user behavior data comprises location data for a plurality of additional user devices each associated with an additional user and wherein the inferred user review for the service provider is further generated by determining a distance each user associated with the plurality of additional user devices traveled to reach the service provider location.

11. The system of claim 1, wherein the ranking engine is configured to generate inferred user reviews for a plurality of additional service providers.

12. The system of claim 11, wherein the ranking engine is further configured to determine a ranking of the service provider relative to the plurality of additional service providers.

13. The method of claim 5, wherein the service provider provides one or more of a service, a product, and an accommodation.

14. The method of claim 5, wherein retrieving the user behavior data for the user comprises scraping one or more applications on the user device for information indicating at least a second location within the plurality of locations.

15. The method of claim 5 further comprising generating inferred user reviews for a plurality of additional service providers.

16. The method of claim 15, wherein generating an inferred user review for the service provider comprises determining a ranking of the service provider relative to the plurality of additional service providers based on a score for each service provider determined at least from the distance the user traveled to reach the location of the service provider, and wherein the method further comprises receiving an electronic search query from a second user device and providing the ranking for display on the second user device in response to the electronic search query.

17. The system of claim 6, wherein the service provider provides one or more of a service, a product, and an accommodation.

18. The system of claim 6, wherein the server is further configured to:
generate inferred user reviews for a plurality of additional service providers; and
determine a ranking of the service provider relative to the plurality of additional service providers.

19. The system of 1, wherein at least a second location within the plurality of locations is determined using one or more short range wireless communications between a beacon associated with the service provider and an application operating in the background of an operating system of the user device.

* * * * *